US009059852B2

(12) United States Patent
Boloker et al.

(10) Patent No.: US 9,059,852 B2
(45) Date of Patent: Jun. 16, 2015

(54) VALIDATING A USER'S IDENTITY UTILIZING INFORMATION EMBEDDED IN A IMAGE FILE

(71) Applicant: International Business Machines Corporation, Armonk, NY (US)

(72) Inventors: David R. Boloker, Brookline, MA (US); Richard Redpath, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 105 days.

(21) Appl. No.: 13/851,494

(22) Filed: Mar. 27, 2013

(65) Prior Publication Data

US 2014/0294175 A1    Oct. 2, 2014

(51) Int. Cl.
*H04L 9/30*    (2006.01)
*H04L 9/28*    (2006.01)
*G09C 5/00*    (2006.01)
*H04L 9/32*    (2006.01)

(52) U.S. Cl.
CPC .. *H04L 9/28* (2013.01); *G09C 5/00* (2013.01); *H04L 9/3263* (2013.01); *H04L 9/3247* (2013.01)

(58) Field of Classification Search
CPC ....... H04L 9/30; H04L 9/3247; H04L 9/3271; H04L 2209/34; H04L 9/3249
See application file for complete search history.

(56) References Cited

U.S. PATENT DOCUMENTS

| | | | |
|---|---|---|---|
| 5,905,800 A * | 5/1999 | Moskowitz et al. | 380/28 |
| 6,181,802 B1 * | 1/2001 | Todd | 382/100 |
| 6,622,015 B1 | 9/2003 | Himmel et al. | |
| 7,058,979 B1 * | 6/2006 | Baudry et al. | 726/32 |
| 7,920,851 B2 | 4/2011 | Moshir | |
| 8,215,546 B2 | 7/2012 | Lin et al. | |

(Continued)

FOREIGN PATENT DOCUMENTS

| | | |
|---|---|---|
| EP | 1054335 A2 | 11/2000 |
| EP | 1349123 A2 | 10/2003 |

(Continued)

OTHER PUBLICATIONS

"Method and Smart Passport for Electronically Associating Travel Tickets, Boarding Passes and Customized Luggage Tags with the Smart Passport of a User", www.ip.com, author unknown, Technical Disclosure IPCOM000197631D, Jul. 17, 2010, 3 pages.

(Continued)

*Primary Examiner* — Fikremariam A Yalew
(74) *Attorney, Agent, or Firm* — Francis Lammes; Stephen J. Walder, Jr.; Jeffrey S. LaBaw (57) ABSTRACT

A mechanism is provided for validating an identity of a user. A signed electronic identification document is received from the user. A signature of the signed electronic identification document is compared utilizing a public key obtained from a certificate authority forming first information and a first image associated with the user. The first information and the first image associated with the user are presented via a user interface associated with a challenge terminal. Responsive to a positive indication that the first information and the first image are associated with the user and responsive to a request to perform additional validation of the user, a read of steganographic information embedded in the first image associated with the user is attempted. Responsive to reading the steganographic information embedded in the first image associated with the user, the identity of the user is validated.

15 Claims, 9 Drawing Sheets

(56) References Cited

U.S. PATENT DOCUMENTS

| | | | |
|---|---|---|---|
| 2001/0037309 A1 | 11/2001 | Vrain | |
| 2002/0168089 A1* | 11/2002 | Guenther et al. | 382/100 |
| 2003/0023858 A1 | 1/2003 | Banerjee et al. | |
| 2005/0105761 A1* | 5/2005 | Zimmer et al. | 382/100 |
| 2005/0125678 A1 | 6/2005 | Shaw et al. | |
| 2005/0138386 A1 | 6/2005 | Le Saint | |
| 2008/0175377 A1* | 7/2008 | Merrill | 380/30 |
| 2009/0201128 A1 | 8/2009 | Campisi | |
| 2011/0179289 A1* | 7/2011 | Guenther | 713/189 |
| 2011/0302412 A1 | 12/2011 | Deng et al. | |
| 2012/0021762 A1 | 1/2012 | Garin et al. | |
| 2012/0112882 A1 | 5/2012 | Martinez De Velasco Cortina et al. | |
| 2013/0166643 A1 | 6/2013 | Essas | |

FOREIGN PATENT DOCUMENTS

| | | |
|---|---|---|
| GB | 2412544 A | 9/2005 |
| KR | 1084347 B1 | 11/2011 |

OTHER PUBLICATIONS

"Method of Secure Mobile Payments Using QR (Quick Response) Code", www.ip.com, author unknown, Technical Disclosure IPCOM000222417D, Oct. 3, 2012, 3 pages.

Braudaway, Gordon W. et al., "Application of Invisible Image Watermarks to Produce Remotely Printed, Duplication Resistant, and Demonstrably Authentic Documents", Proceedings of the Security and Watermarking of Multimedia Contents III, vol. 4314, Aug. 1, 2001, pp. 351-359.

Redpath, Richard , "Issuing, Presenting and Challenging Mobile Device Identification Documents", U.S. Appl. No. 13/540,685, filed Jul. 3, 2012, 21 pages.

"Close up proof we produce the best fake id online", www.link-i-d.com (no. longer available), downloaded May 21, 2012, 4 pages.

"Fake ID Sites Reviewed", http://www.underground-review.com/F_ID.html, Oct. 2004, 2 pages.

McGrew, Stephen P., "Hologram Counterfeiting: Problems and Solutions,", New Light Industries, Ltd., downloaded May 21, 2012, 8 pages.

* cited by examiner

402 — PIXEL VALUES

| 139 | 144 | 149 | 153 | 155 | 155 | 155 | 155 |
| --- | --- | --- | --- | --- | --- | --- | --- |
| 144 | 151 | 153 | 156 | 159 | 156 | 156 | 156 |
| 150 | 155 | 160 | 163 | 158 | 160 | 156 | 159 |
| 159 | 161 | 162 | 160 | 160 | 159 | 159 | 159 |
| 159 | 160 | 161 | 161 | 162 | 162 | 155 | 155 |
| 161 | 161 | 161 | 161 | 160 | 157 | 157 | 157 |
| 162 | 162 | 161 | 163 | 162 | 163 | 157 | 157 |
| 162 | 162 | 161 | 161 | 163 | 158 | 158 | 158 |

404 — FREQUENCY COEFFICIENT VALUES

| (1260) | -1  | -12 | -5  | 2   | -2  | -3  | 1   |
| ---    | --- | --- | --- | --- | --- | --- | --- |
| -23    | -17 | -6  | -3  | 2   | 0   | 0   | 1   |
| -11    | -9  | -2  | 2   | -1  | -1  | 0   | -1  |
| -7     | -2  | 0   | 1   | 2   | 0   | 1   | 0   |
| -1     | -1  | 1   | 2   | 0   | -1  | 1   | 1   |
| 2      | 0   | 2   | 0   | -1  | 0   | 1   | -1  |
| -1     | 0   | 0   | -1  | -2  | 2   | 2   | -1  |
| -3     | 2   | 2   | -4  | -2  | 1   | -1  | 0   |

406 circles the 1260 value.

FIG. 5

504 — FREQUENCY COEFFICIENT VALUES

| 1260 | -1  | -12 | -5  | 2   | -2  | -3  | 1   |
| ---  | --- | --- | --- | --- | --- | --- | --- |
| -23  | -17 | -6  | -3  | 2   | 0   | 0   | 1   |
| -11  | -9  | -2  | 2   | -1  | -1  | 0   | -1  |
| -7   | -2  | 0   | 1   | 2   | 0   | 1   | 0   |
| -1   | -1  | 1   | 2   | 0   | -1  | 1   | 1   |
| 2    | 0   | 2   | 0   | -1  | 0   | 1   | -1  |
| -1   | 0   | 0   | -1  | -2  | 2   | 2   | -1  |
| -3   | 2   | 2   | -4  | -2  | 1   | -1  | 0   |

506 — QUANTIZATION TABLE

| 16 | 11 | 10 | 16 | 24  | 40  | 51  | 61  |
| -- | -- | -- | -- | --- | --- | --- | --- |
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

508 — QUANTIZED FREQUENCY COEFFICIENT VALUES

| 79 | 0  | -1 | 0 | 0 | 0 | 0 | 0 |
| -- | -- | -- | - | - | - | - | - |
| -2 | -1 | 0  | 0 | 0 | 0 | 0 | 0 |
| -1 | 0  | 0  | 0 | 0 | 0 | 0 | 0 |
| 0  | 0  | 0  | 0 | 0 | 0 | 0 | 0 |
| 0  | 0  | 0  | 0 | 0 | 0 | 0 | 0 |
| 0  | 0  | 0  | 0 | 0 | 0 | 0 | 0 |
| 0  | 0  | 0  | 0 | 0 | 0 | 0 | 0 |
| 0  | 0  | 0  | 0 | 0 | 0 | 0 | 0 |

VALIDATING A USER'S IDENTITY UTILIZING INFORMATION EMBEDDED IN A IMAGE FILE

BACKGROUND

The present application relates generally to an improved data processing apparatus and method and more specifically to mechanisms for validating a user's identity utilizing information embedded in an image file.

Driver's licenses and other identification documents may be issued by state governments to individuals, where the individuals may be required to present the licenses to various other third parties such as airport security, customs, immigration, police, nightclubs, controlled beverage stores, banks, credit card merchant account processors, firearm vendors, military sites, employers, etc. A common security concern may exist at a local, state, national, and even global level with regard to the creation and use of forged (e.g., fake) driver's licenses. Indeed, a significant market may exist for forged driver's licenses that might be used as false evidence of U.S. citizenship. For example, certain counterfeiters may be able to recreate watermarks, holograms, ultraviolet (UV) veneer coatings, etc., on physical licenses to a high level of precision and in many different contexts. While the use of electronic identification (ID) documents may be a potential solution, there remains considerable room for improvement. For example, the need to be able to present licenses to a wide variety of third parties can pose implementation difficulties that may not be addressed by conventional electronic ID solutions.

SUMMARY

In one illustrative embodiment, a method, in a data processing system, is provided for validating an identity of a user. The illustrative embodiment receives a signed electronic identification document from the user. The illustrative embodiment compares a signature of the signed electronic identification document utilizing a public key obtained from a certificate authority forming first information and a first image associated with the user. In the illustrative embodiment, the certificate authority originally issued the signed electronic identification document to the user. The illustrative embodiment presents the first information and the first image associated with the user via a user interface associated with a challenge terminal. The illustrative embodiment attempts a read of steganographic information embedded in the first image associated with the user in response to a positive indication that the first information and the first image are associated with the user and responsive to a request to perform additional validation of the user. The illustrative embodiment validates the identity of the user in response to reading the steganographic information embedded in the first image associated with the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, a driver's licenses and other image identification documents may be utilized as a form of identification to various other third parties such as airport security, customs, immigration, police, nightclubs, controlled beverage stores, banks, credit card merchant account processors, firearm vendors, military sites, employers, etc. However, many, if not all, image identification documents may be forged in order to circumvent many of the third parties that require such image identification documents.

Therefore, the illustrative embodiments provide for embedding binary information through the use of steganography into electronic image identification documents which are provided to the user by an issuing party. That is, steganography is used to randomly embed binary information into one or parts of an electronic image identification document using a forward Discrete Cosine Transform, which transforms values into frequencies. When the user provides the electronic image identification document to a third party, the third party utilizes a steganography reader to read the embedded binary information as another layer of identity verification.

Figure 1:
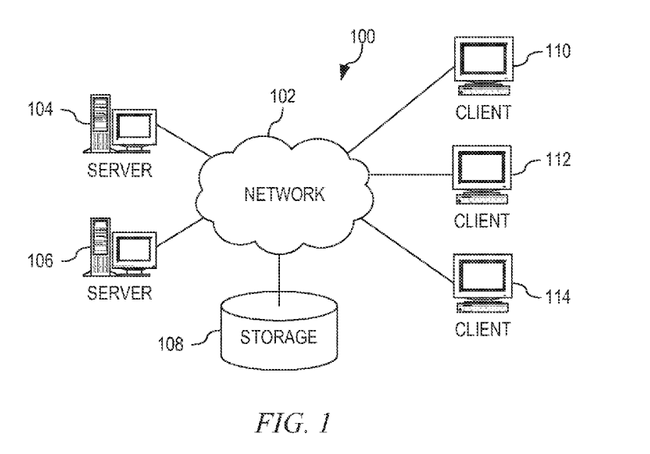
FIG. 1 is an example diagram of a distributed data processing system in which aspects of the illustrative embodiments may be implemented.
Figure 2:
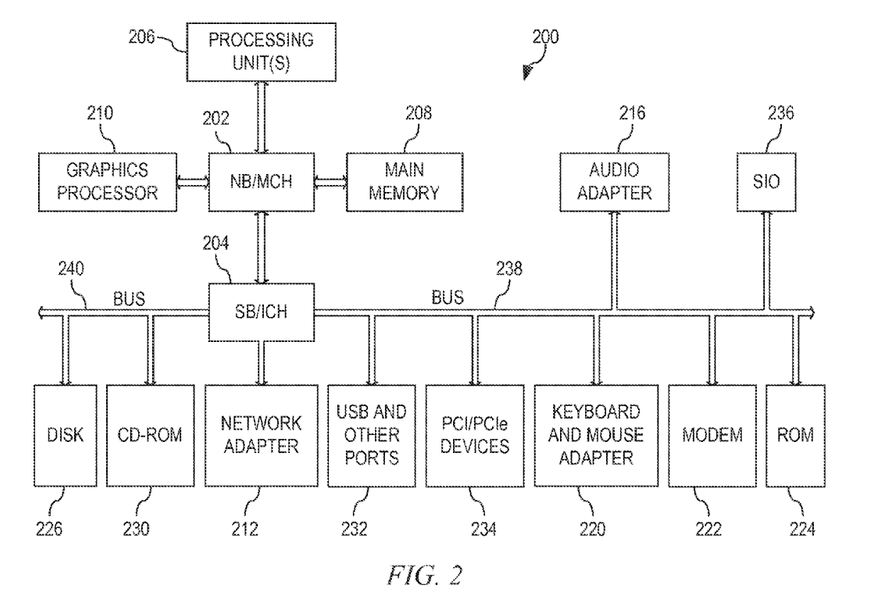
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3A:
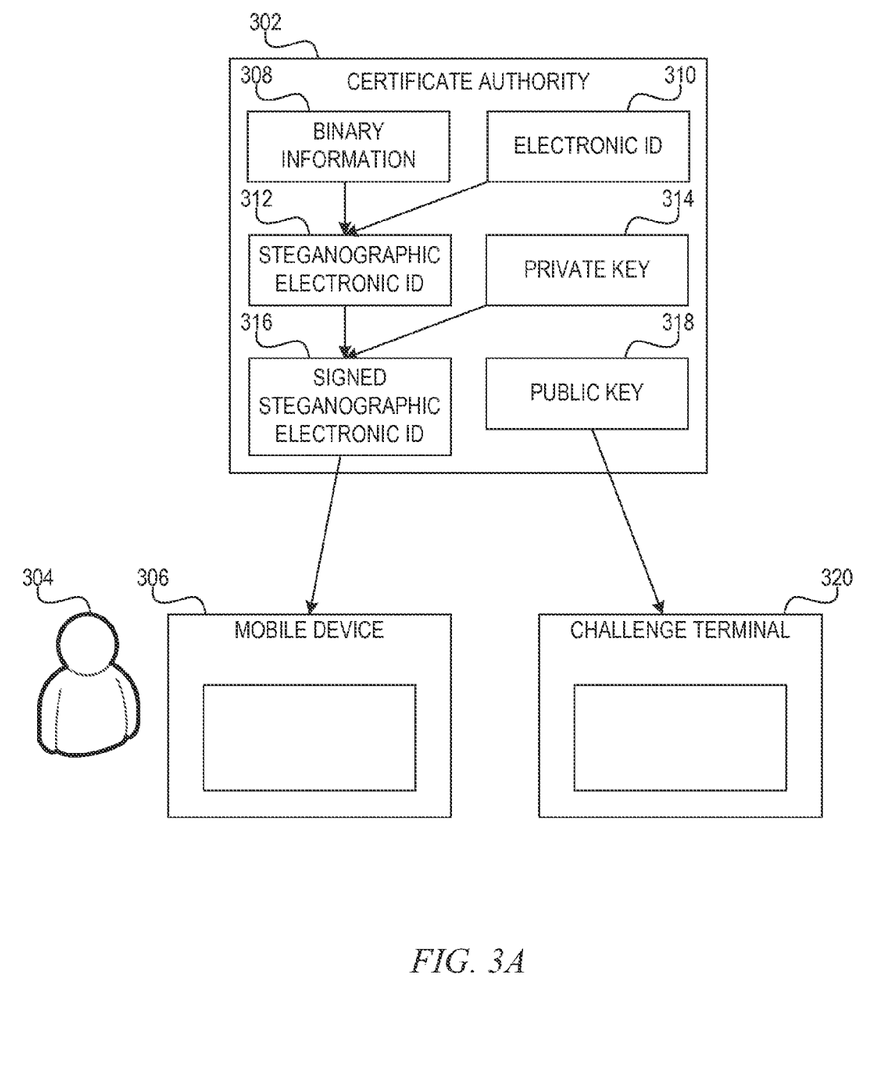
FIG. 3A illustrates the issuance of an electronic ID document in accordance with an illustrative embodiment.
Figure 3B:
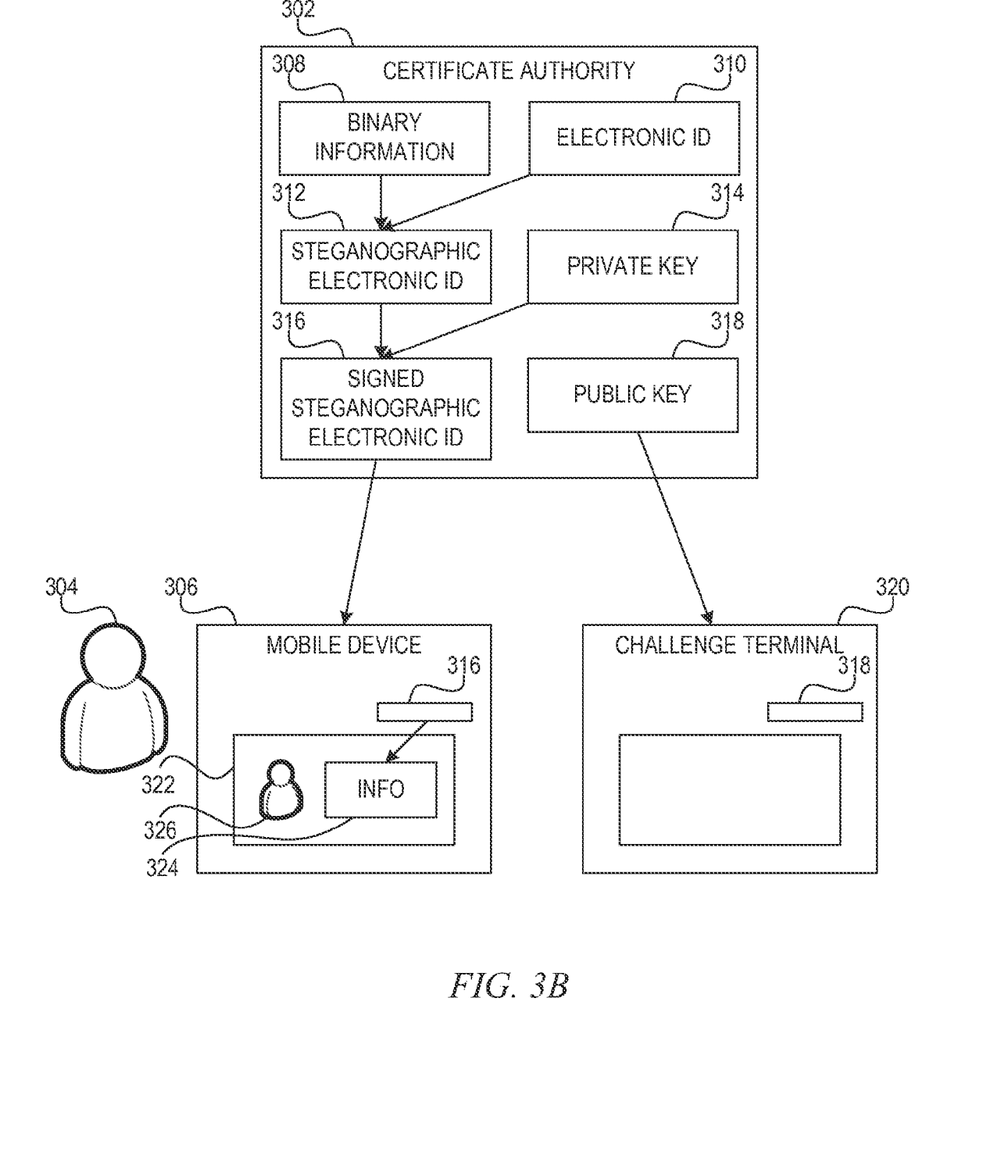
FIG. 3B illustrates a presentation of an electronic ID document in accordance with an illustrative embodiment.
Figure 3C:
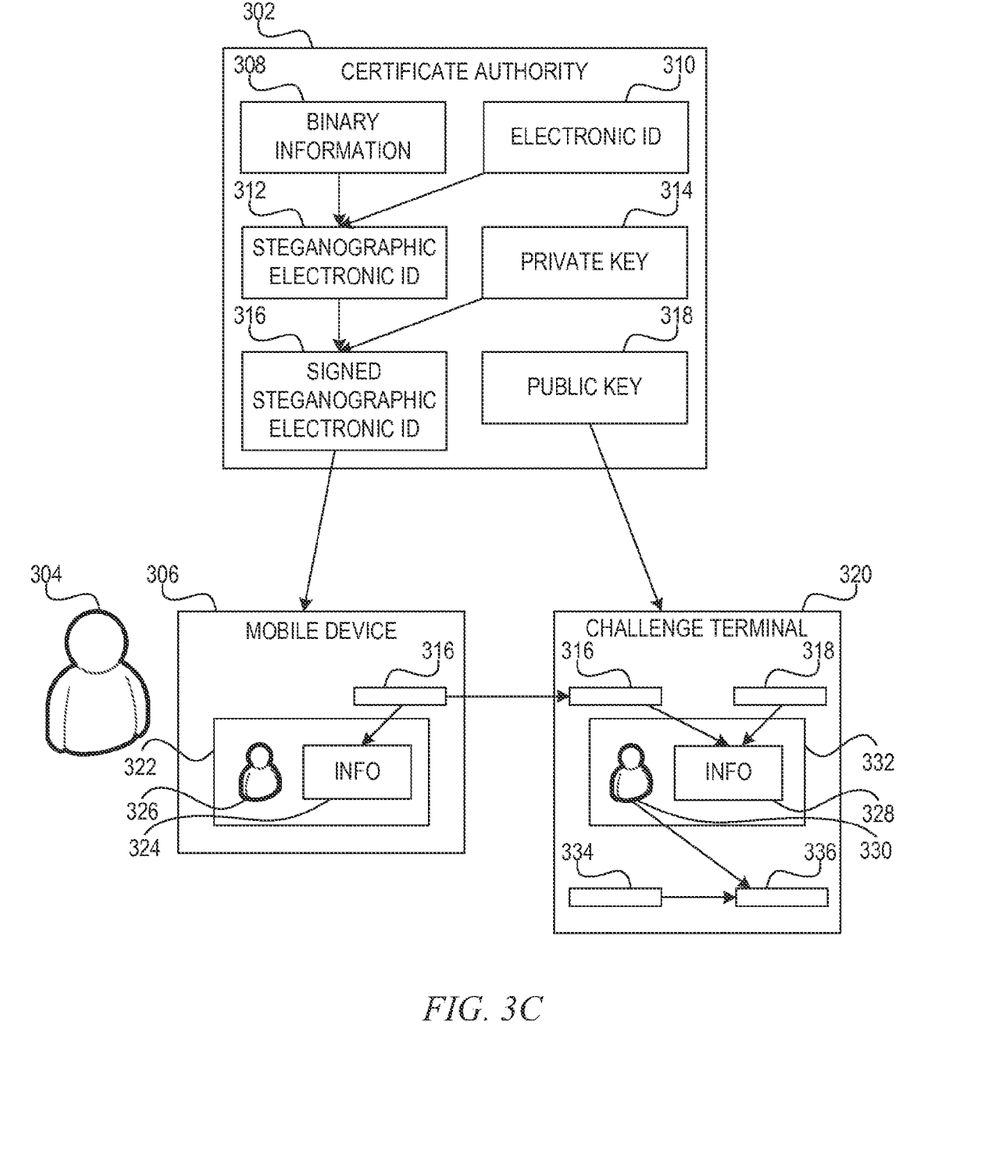
FIG. 3C illustrates the processing of a challenge request in accordance with an illustrative embodiment.

FIGS. 3A-3C illustrate the issuance, presentation, and challenge stages of an electronic identification (ID) document, respectively, in accordance with an illustrative embodiment. With specific reference to FIG. 3A and the issuance of an electronic ID document that includes user information and a photograph of the user in accordance with an illustrative embodiment, certificate authority 302 may respond to an electronic ID document request from user/individual 304 having mobile device 306 such as a smart phone, smart tablet, personal digital assistant (PDA), or the like. Certificate authority 302 may be associated with, for example, a state department of motor vehicles (DMV) that is authorized to issue driver's licenses and other identification (ID) documents to individuals, such as user 304. As another example, certificate authority may be an airline that issues an electronic ticket (e-ticket) to individuals, such as user 304. Other examples of electronic ID documents may include, but are not limited to, passports, military IDs, employment IDs, student IDs, or the like.

In one example, user 304 is required to pay for the requested electronic ID document, wherein certificate authority 302 may verify payment for the electronic ID document by user 304 prior to issuing the requested electronic ID document. Certificate authority 302 may also verify other aspects of the electronic ID document request, such as, in the case of a state DMV, the satisfactory completion of various driver licensing requirements (e.g., age, written certification, road certification, vision certification, etc.), or, in the case of an airline, an address, frequent flier miles, identity verification through the submission of an electronic driver's license, or the like.

Upon verifying the appropriate document issuance requirements, certificate authority 302 embeds binary information 308 into the photograph of the user in electronic ID document 310 associated with user 304, which results in the generation of steganographic electronic ID document 312 for user 304. The binary information may include the user's name, address, birth date, issue date, expiration date, driver's license number, height, weight, eye color, restrictions, criminal history, or the like. A detailed description of how the binary information is embedded into the photograph of electronic ID document 310 as will be discussed in greater detail below. Certificate authority 302 may then apply a signature via private key 314 to the photograph of steganographic electronic ID document 312 to obtain a signed steganographic electronic ID document 316. Certificate authority 302 may then send signed steganographic electronic ID document 316 that includes the signature to mobile device 306 associated with user 304. While the signature is included with signed steganographic electronic ID document 316, user 304 is not aware of the signature as user 304 does not need signature.

Indeed, signed steganographic electronic ID document 316 may be packaged together into an application or app that is signed and downloaded onto mobile device 306 via a wired or wireless connection. Of particular note is that certificate authority 302 maintains private key 314 in a secure state that is inaccessible by other parties. Moreover, the read only nature of signed steganographic electronic ID document 316 may further reduce the likelihood of tampering with the underlying photograph and/or other ID content.

Certificate authority 302 also makes private key 314 generally available as public key 318 to other parties and/or devices such as, for example, challenge terminal 320. Challenge terminal 320 may be associated with another entity such as, for example, airport security (e.g., Transportation Security Administration (TSA)), police (e.g., state and/or local), nightclubs, controlled beverage stores, banks, credit card merchant account processors, firearm vendors, military sites, employers, or the like. For example, certificate authority 320 may publish public key 318 to an appropriate publication source such as a web portal, directory, listing, subscription service, or the like. As will be discussed in greater detail, challenge terminal 320 may also obtain public key 318 from certificate authority 302 directly via a key request, and so forth.

FIG. 3B illustrates a presentation of an electronic ID document in accordance with an illustrative embodiment. Generally, upon receipt of signed steganographic electronic ID document 316 from certificate authority 302 on mobile device 306, signed steganographic electronic ID document 316 may be stored to local memory on mobile device 306 and user 304 may carry mobile device 306 with him or her in place of a physical ID document. More particularly, if user 304 enters a physical area associated with challenge terminal 320 and is asked (e.g., by police officer, TSA agent, bouncer, etc., not shown) to present identification, user 304 may use user interface 322, such as a touch screen, keyboard, or the like, of mobile device 306 to initiate a display request. Indeed, user 304 may even be remote from challenge terminal 320, where user 304 might participate in a video conferencing session (e.g., Skype session) with the authoritative person checking signed steganographic electronic ID document 316 of user 304. In response to the display request, mobile device 306 may output signed steganographic electronic ID document 316, which includes user information 324 and photograph 326 via user interface 322 or other appropriate display of mobile device 306. Accordingly, user 304 may then show user information 324 and photograph 326 to the authoritative person (e.g., police officer, TSA agent, bouncer, etc.) associated with challenge terminal 320.

As already noted, signed steganographic electronic ID document 316 may include user information 324 and photograph 326 of user 304 or of the person whom user 304 is impersonating. Thus, the authoritative person associated with challenge terminal 320 may decide based on, for example, visual differences between user 304 and user information 324/photograph 326, suspicions regarding the identity, age, residence, citizenship of user 304, random selection, or the like, that the displayed user information 324 and photograph 326 may not be trustworthy. In such a case, the authoritative person associated with challenge terminal 320 may request user 304 to initiate a challenge request on mobile device 306.

FIG. 3C illustrates the processing of a challenge request in accordance with an illustrative embodiment. Responsive to an authoritative person associated with challenge terminal 320 requesting user 304 initiate a challenge request on mobile device 306, user 304 may initiate via user interface 322 the transfer of signed steganographic electronic ID document 316 from mobile device 306 to challenge terminal 320. In one example, mobile device 306 transfers signed steganographic electronic ID document 316 with the signature to challenge terminal 320 via a wireless interface (e.g., Bluetooth, infrared (IR), Wi-Fi, near field communication (NFC), or the like, not shown). In another example, a "bump" interaction between mobile device 306 and challenge terminal 320 may be used to initiate the challenge request. As yet another example, signed steganographic electronic ID document 316 could be sent from mobile device 306 through the Internet to challenge terminal 320. Challenge terminal 320, which may be any suitable computing system such as a work station, desktop computer, notebook computer, smart tablet, mobile device, or the like, may receive the signed steganographic electronic ID document 316 with the signature, and apply public key 318 to signed steganographic electronic ID document 316 in order to verify the signature of signed steganographic electronic ID document 316. Challenge terminal 320 may also output user information 328 and photograph 330 via display 332. As stated before, challenge terminal 320 may obtain public key 318 either offline or in real-time from a suitable key publication source or directly from certificate authority 302 (e.g., via explicit key request). However, it should be noted that challenge terminal 320 only needs to obtain public key 318 one time for all documents issued by certificate authority 302. Thus, challenge terminal 320 acts as an independent authority to validate documents and is not dependent on certificate authority 302, which issued the original document.

If signed steganographic electronic ID document 316 received from mobile device 306 does not pass validation by verification of the signature associated with signed steganographic electronic ID document 316 using public key 318, challenge terminal 320 will not display user information 328 and present invalid document dialog and/or picture thus indicating that signed steganographic electronic ID document 316 is invalid. The read only nature of signed steganographic electronic ID document 316 may further reduce the likelihood of tampering with the underlying photograph and/or other ID content, as already noted. Additionally, if user 304 tampers with user information 324 or photograph 326 (e.g., to change the birth date or alters the photograph of the signed steganographic electronic ID document 316) or shows a different ID document at the presentation stage, the authoritative person associated with challenge terminal 320 may readily be able to visually see the differences between user information 324 and/or photograph 326 on user interface 322 of mobile device 306 and user information 328 and/or photograph 330 of the legitimate signed steganographic electronic ID document 316 shown on display 332 of challenge terminal 320. Thus, any forgery attempts on the part of user 304 may be readily detected in the illustrated example.

As an additional identity verification mechanism, challenge terminal 320 may also utilize steganographic reader 334 on photograph 330 of signed steganographic electronic ID document 316. For example, if the authoritative person does not have any suspicions regarding the identity, age, residence, citizenship of user 304 based on user information 328 and photograph 330, then the authoritative person may still apply an additional identity verification mechanism through steganographic reader 334. That is, user 304 may have been able to tamper with signed steganographic electronic ID document 316 as well as private key 314 or public key 318. However, in tampering with either of these, the hidden binary information embedded within photograph 330 will have been corrupted. Steganographic reader 334 extracts binary information 308 from photograph 330 which results in steganographic information 336. Steganographic information 336 is excerpted from photograph 330 in a Lightweight Directory Access Protocol (LDAP) Data Interchange Format (LDIF). Challenge terminal 320 displays steganographic information 336 on display 332. If the steganographic information 336 results in readable information which identifies user 304, then the authoritative person may reasonably rest assured that user 304 is the person associated with visible user information 328 and/or photograph 330. Furthermore, the steganographic information 336 may then be used by challenge terminal 320 to automatically populate fields within other documents, such as airline tickets, passport applications, or the like. However, if the steganographic information 336 is in some way corrupted indicating that photograph 330 has been tampered with, then the authoritative person may perform an appropriate action with regard to user 304.

In accordance with the illustrative embodiments, photograph 330 may be in a 'JPG' format or a 'PNG' format, which are the most common formats for mobile devices, such as mobile device 306. PNG is a lossless file format, which indicates that, after manipulating the bits of pixels of these formats when you create the new image, no data is lost. This is the reason that, when using the PNG format, all the hidden data is retrievable. However, while PNG formats are one standard for mobile devices, the data using the PNG format is large for decipher performance. That is, for example, a 50K JPG image would be a 450K PNG image. A 50K JPG image will take 4 seconds to decipher at 1024 RSA, whereas a 450K PNG image will take at least 9 times longer. Hence, the illustrative embodiments preferably utilize the JPG format for performance, although any image format may be used.

In contrast to the PNG format, the JPG format uses a lossy compression technique, which may cause the embedded binary information 308 hidden in the pixels of the image to be lost. Therefore, in addition to utilizing the JPG format, the illustrative embodiments utilize Direct Cosine Transform method or F5 steganography algorithm for hiding information associated with user 304 in the JPG image. Utilizing F5 steganography, certificate authority 302 mixes binary information 308 associated with user 304 within the actual pixel information of the JPG image. In general, certificate authority 302 chooses pixels in the JPG image of user 304 using a custom random number generator so as to index pixels in the image. Certificate authority 302 then modifies the chrominance of these chosen pixels so as to hide binary information 308 associated with user 304. The steganography reader in challenge terminal 320 uses the same custom random number generator to find the pixels that have been modified and read the hidden information.

In detail, JPG images use a different color space than bitmap images. The three color coefficients (Red, Green, Blue (RGB)) for each pixel are transformed into a new coding scheme: one luminance coefficient (the intensity—if only this coefficient is kept the resulting image is in black and white), and two chrominance coefficients (the actual color in a two dimensional grid defined by a Blue/Yellow and a Red/Green axis), which results in YCbCr pixel values. Because the human eye is much more sensitive to luminosity than it is to colors, much of the color information may be removed without noticeably changing the perception of the image. Most of the time, four adjacent pixels are averaged into one value. Thus, ((⅓*¾)*2) of the image information may be removed, which is approximately half of the original image information, which results in subsampled YCbCr pixel values.

The remaining pixel values are transformed, 8×8 blocks at a time, by a forward Discrete Cosine Transform (DCT), which transforms the subsampled YCbCr pixel values into frequencies. That is, the forward DCT decomposes the YCbCr pixel values into several cosines functions of different frequencies. Thus, the 64 pixel values associated with each 8×8 block are transformed into 64 frequency coefficient values. While the transformation results in replacing the 64 pixel values with 64 frequency coefficient values, most of these frequency coefficient values will be very low.

Figure 4:
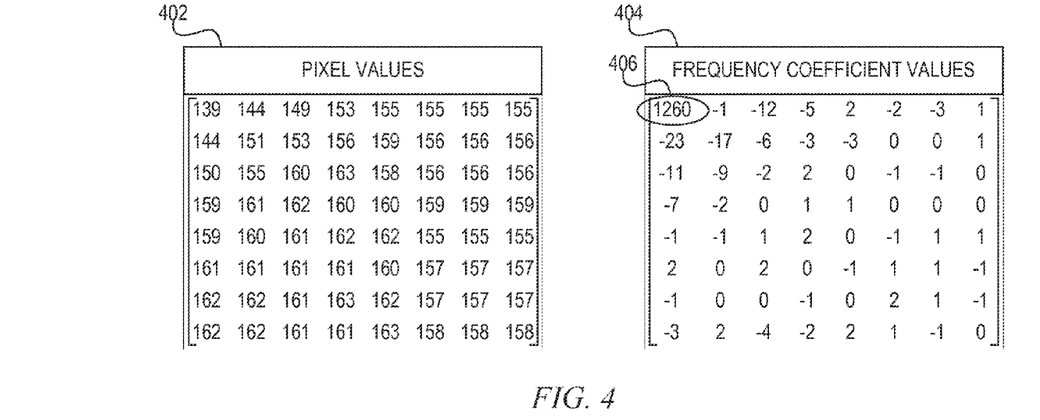
FIG. 4 depicts a comparison of an exemplary 8×8 block of pixel values prior to forward Discrete Cosine Transform (DCT) decomposition and an exemplary 8×8 block of frequency coefficient values after a forward DCT decomposition in accordance with an illustrative embodiment.

FIG. 4 depicts a comparison of an exemplary 8×8 block of pixel values prior to forward Discrete Cosine Transform (DCT) decomposition and an exemplary 8×8 block of frequency coefficient values after a forward DCT decomposition in accordance with an illustrative embodiment. 8×8 block of pixel values 402 represents either luminance or chrominance data for a JPG image and 8×8 block frequency coefficient values 404 for the same JPG image after a forward DCT transform. In 8×8 block frequency coefficient values 404, the low frequency coefficient value 406 is on the top left. Low frequency coefficient value 406 is the highest value, because low frequency coefficient value 406 encodes the data with the highest importance and the lowest frequency, which is basically the average value of all of this blocks pixels. As is illustrated, in 8×8 block frequency coefficient values 404, the frequency coefficient values are still high around low frequency coefficient value 406. Then, the as the 8×8 block frequency coefficient values 404 is traversed to the bottom right corner (the high frequencies), the frequency coefficient values go down. If at this point certificate authority 302 of FIG. 3 performs an inverse cosine transform on 8×8 block frequency coefficient values 404, certificate authority 302 recovers the starting pixels values (8×8 block of pixel values 402) minus any rounding errors, i.e. approximately the same JPG image.

However, space saving has been realized by certificate authority 302 merely transforming the 8×8 block of pixel values 402 into the 8×8 block frequency coefficient values 404. That is, there are 64 values in the 8×8 block of pixel values 402 and 64 values in the 8×8 block frequency coefficient values 404. In order to realize some space savings, certificate authority 302 quantizes the remaining frequency coefficient values in 8×8 block frequency coefficient values 404. That is, each of the frequency coefficient values in 8×8 block frequency coefficient values 404 are divided one by one with a table of fixed quantization values and each of the results are rounded. The higher the values in 8×8 block frequency coefficient values 404, the more details will be eliminated. Thus, certificate authority 302 actually eliminates the high frequency coefficients toward the bottom right corner of 8×8 block frequency coefficient values 404. For example, removing the small wavelets on top of a big wave or irregular spikes on a noisy experimental curve, i.e. "smoothing." By eliminating the high frequency coefficients, certificate authority 302 provides quantized frequency coefficient values, where most of the frequency coefficient values are equal to zero.

Figure 5:
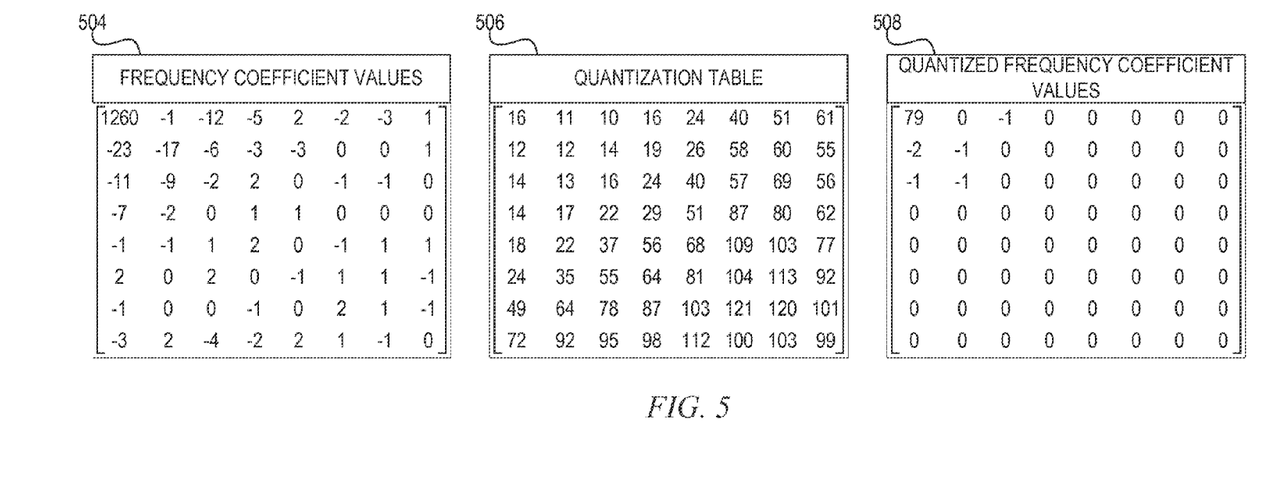
FIG. 5 depicts a comparison of an exemplary 8×8 block of frequency coefficient values after a forward DCT decomposition, an exemplary 8×8 quantization table, and an exemplary 8×8 block of quantized frequency coefficient values after quantizing in accordance with an illustrative embodiment.

FIG. 5 depicts a comparison of an exemplary 8×8 block of frequency coefficient values after a forward DCT decomposition, an exemplary 8×8 quantization table, and an exemplary 8×8 block of quantized frequency coefficient values after quantizing in accordance with an illustrative embodiment. 8×8 block frequency coefficient values 504 are the same frequency coefficient values as in 8×8 block frequency coefficient values 404 of FIG. 4. Quantization table 506 is an exemplary table of quantization values that will be used to quantize 8×8 block frequency coefficient values 504. 8×8 block of quantized frequency coefficient values 508 depicts the results of dividing each of the frequency coefficient values with its associated fixed quantization value from quantization table 506. As is shown in 8×8 block of quantized frequency coefficient values 508, numerous quantized frequency coefficient values are now zero, specifically, 58 out of 64, which provided substantial compression.

Figure 6:
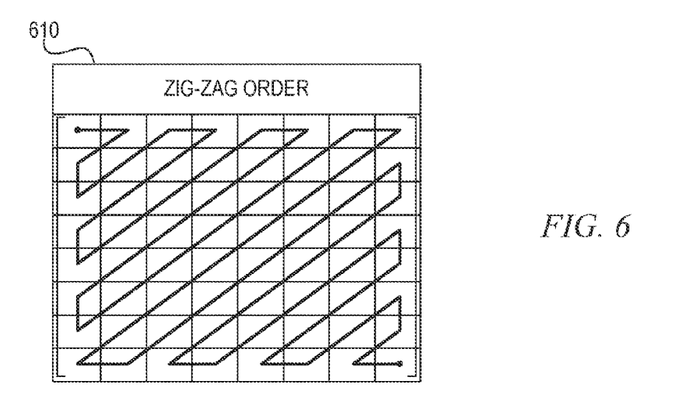
FIG. 6 depicts a re-ordering of all the quantized frequency coefficient values into an exemplary "zig-zag" order in accordance with an illustrative embodiment.

Certificate authority 302 now re-orders all the quantized frequency coefficient values into an exemplary "zig-zag" order 610 as is shown in FIG. 6 in accordance with an illustrative embodiment, which places a maximum of zeroes close to each other for better compression. "Zig-zag" order 610 is referred to as a "zig-zag" because of how the quantized frequency coefficient values are ordered through an 8×8 block, which places most of the zeroes close to the bottom right of the 8×8 matrix.

After the quantized frequency coefficient values are placed in the "zig-zag" order, certificate authority 302 executes a simple Run-Length Encoding (RLE) because of the numerous zeroes to compress the high frequency coefficient values, i.e., the lower right values, within the quantized frequency coefficient values. Certificate authority 302 also executes a Differential Pulse Code Modulation (DPCM) to compress the first low frequency coefficient value, i.e. the upper left value, within the quantized frequency coefficient values. Finally, certificate authority 302 executes a classic Huffman algorithm to compress all of the quantized frequency coefficient values. Certificate authority 302 then stores the Huffman tree information in the header of the JPG image.

Again, while the above description preferably embeds and encodes the steganographic information in a JPG image using several layers of compression and mathematical transformations, the illustrative embodiments recognizes that the steganographic information may be embedded and encoded into any type of image format, such as PNG, BMP, or the like, using the same or other layers of compression and mathematical transformations without departing from the spirit and scope of the invention. Further, the above description describes a canonical compression and mathematical transformation of a JPG image, the illustrative embodiments recognize that there are several variations of compression and/or mathematical transformation that may be utilized to embed steganographic information into an image file.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
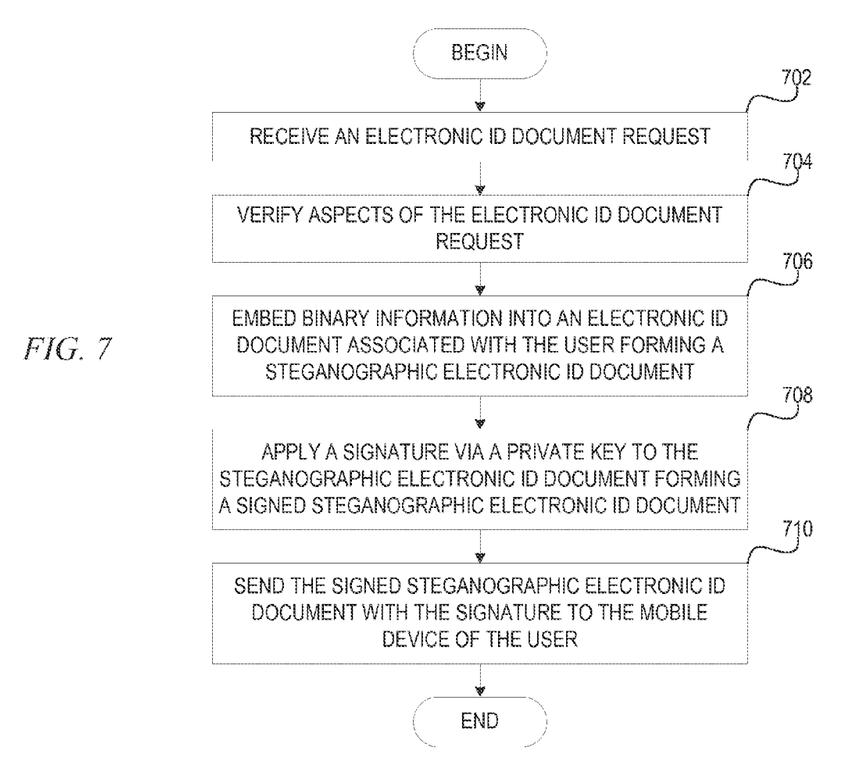
FIG. 7 depicts an exemplary operation performed in issuing an electronic ID document in accordance with an illustrative embodiment.

FIG. 7 depicts an exemplary operation performed in issuing an electronic ID document in accordance with an illustrative embodiment. As the operation begins, a certificate authority receives an electronic ID document request from a user having a mobile device, such as a smart phone, smart tablet, personal digital assistant (PDA), or the like (step 702). The certificate authority verifies aspects of the electronic ID document request (step 704). Upon verifying the appropriate document issuance requirements, the certificate authority embeds binary information into an electronic ID document associated with the user, which results in the generation of a steganographic electronic ID document (step 706). The certificate authority then applies a signature via a private key to the steganographic electronic ID document to obtain a signed steganographic electronic ID document (step 708). The certificate authority sends the signed steganographic electronic ID document that includes the signature to mobile device of the user (step 710), with the operation ending thereafter.

Figure 8:
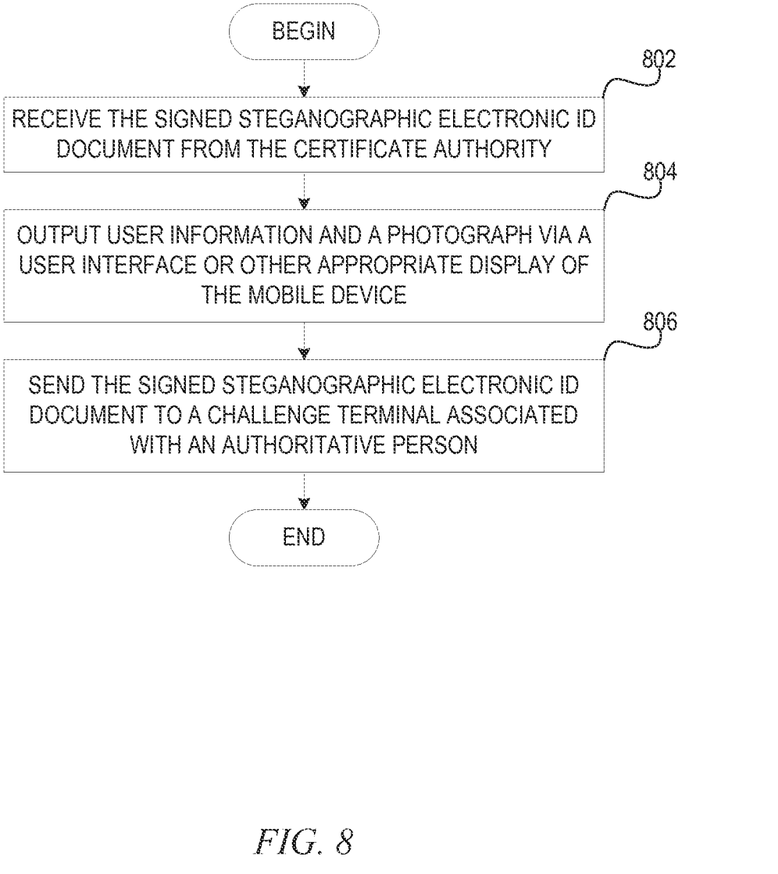
FIG. 8 depicts an exemplary operation performed in presenting an electronic ID document in accordance with an illustrative embodiment.

FIG. 8 depicts an exemplary operation performed in presenting an electronic ID document in accordance with an illustrative embodiment. As the operation begins, a mobile device associated with a user receives the signed steganographic electronic ID document from the certificate authority (step 802). Responsive to a request to display the electronic ID document, the mobile device outputs user information and a photograph of the signed steganographic electronic ID document via a user interface or other appropriate display of the mobile device (step 804). It should be noted that the user simply displays the electronic ID document because the user has no facility to read the steganographic information embedded in the electronic ID document. Thus, the user of the mobile device is only able to display the user information and the photograph of the signed steganographic electronic ID document on the user's mobile device. Responsive to receiving a challenge request to the set of user information and the photograph, the mobile device sends the signed steganographic electronic ID document with the signature to a challenge terminal associated with an authoritative person who is challenging the set of user information and the photograph presented on the user interface of the mobile device (step 806), with the operation ending thereafter.

Figure 9:
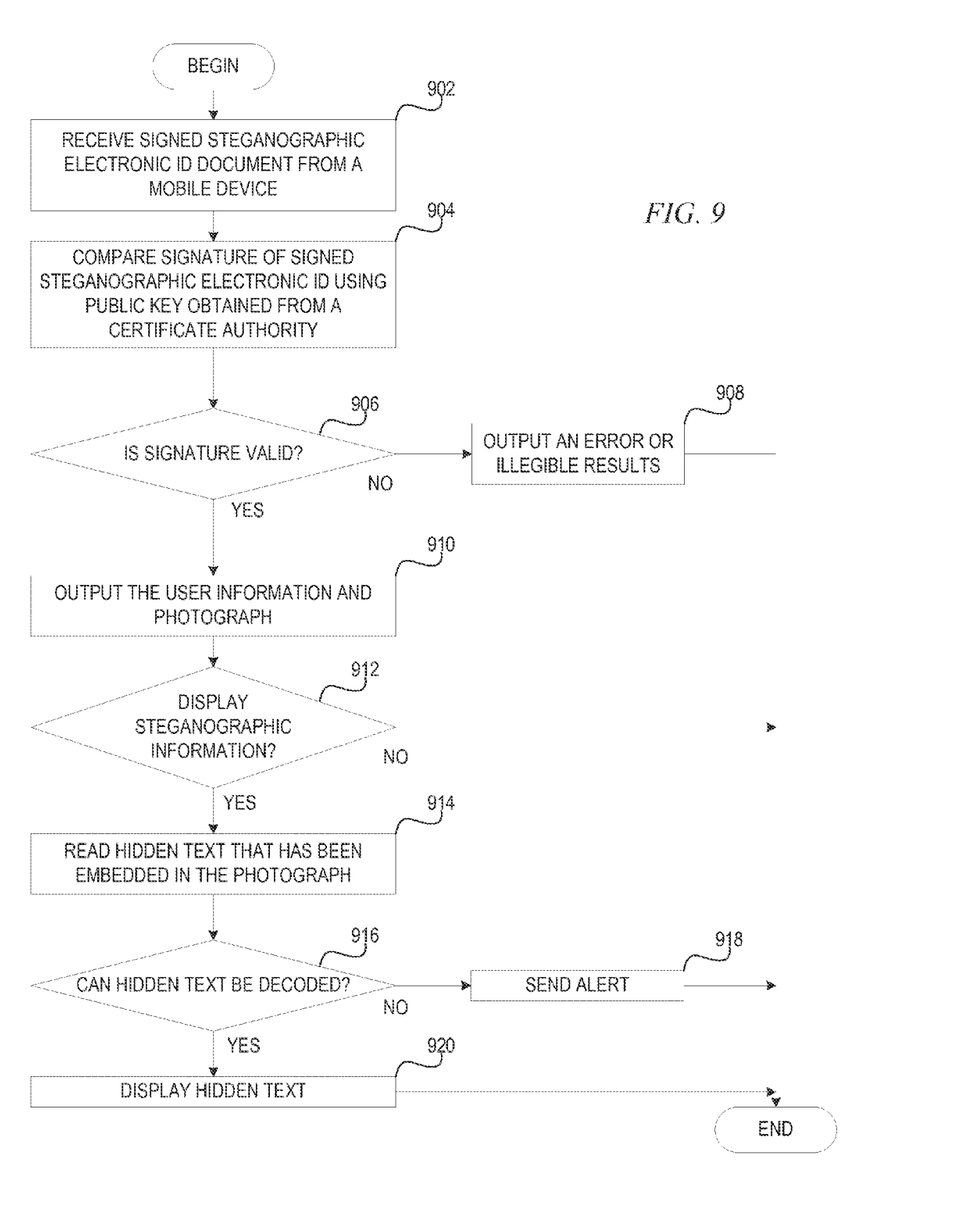
FIG. 9 depicts an exemplary operation performed in processing a challenge request to an electronic ID document in accordance with an illustrative embodiment.

FIG. 9 depicts an exemplary operation performed in processing a challenge request to an electronic ID document in accordance with an illustrative embodiment. As the operation begins, the challenge terminal associated with the authoritative person requesting the user initiate a challenge request on the user's mobile device, the challenge terminal receives the signed steganographic electronic ID document from the mobile device (step 902). The challenge terminal compares the signature associated with the signed steganographic electronic ID document using a public key obtained from a certificate authority (step 904). The challenge terminal then determines whether the signed steganographic electronic ID document is valid (step 906). If at step 906 the signed steganographic electronic ID document cannot be validated, the challenge terminal outputs an error or illegible results (step 908), thereby notifying the authoritative person that the signed steganographic electronic ID document is either forged or has been tampered with and the operation ends thereafter.

If at step 906 the signed steganographic electronic ID document is validated, then the challenge terminal outputs user information and the photograph via a display associated with the challenge terminal (step 910), thereby allowing the authoritative person to visually compare the user information and the photograph on the display associated with the challenge terminal to the user and/or the user information and the photograph on the user interface of the mobile device of the user as well as the physical user. The challenge terminal prompts the authoritative person as to whether to display steganographic information associated with the signed steganographic electronic ID document (step 912). If at step 912 the prompt is declined, then the operation ends. If at step 912 the prompt is accepted, then the challenge terminal utilizes a steganographic reader on the photograph of signed steganographic electronic ID document to read hidden text that has been embedded in the photograph (step 914). The challenge terminal then determines whether the hidden text can be decoded by the steganographic reader (step 916). If at step 916 the steganographic reader has not been able to decode the hidden text in the photograph due to tampering with the photograph, then the challenge terminal alerts the authoritative person of the tempering (step 918), with the operation ending thereafter. If at step 916 the steganographic reader is able to decode the hidden text in the photograph, then the challenge terminal displays the hidden user information thereby indicating to the authoritative person that the signed steganographic electronic ID document is valid (step 920), with the operation ending thereafter. The steganographic information may then be used by the challenge terminal to automatically populate fields within other documents, such as airline tickets, passport applications, or the like.

Figure 10:
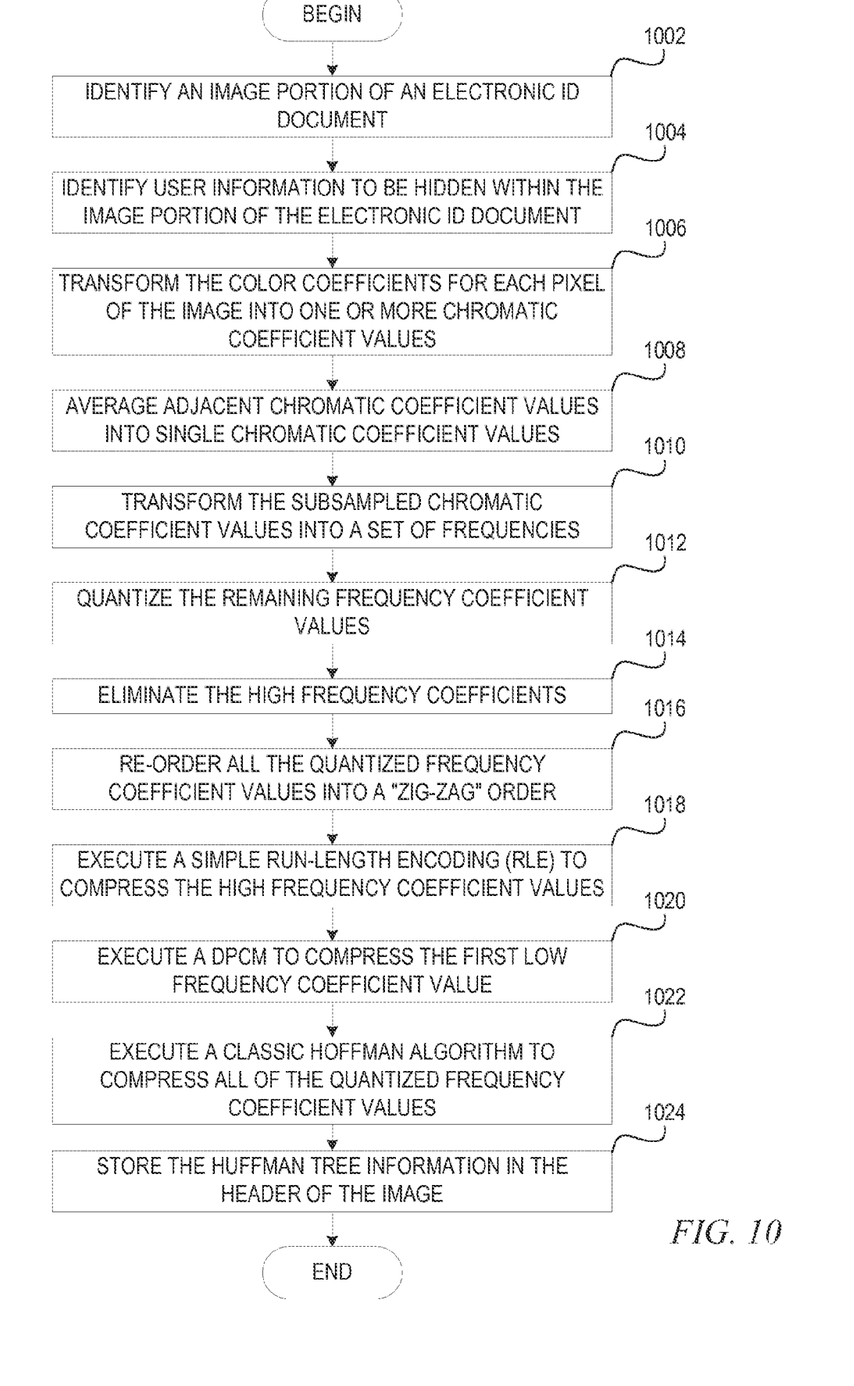
FIG. 10 depicts an exemplary operation performed in embedding steganographic information into an image of an electronic ID document in accordance with an illustrative embodiment.

FIG. 10 depicts an exemplary operation performed in embedding steganographic information into an image of an electronic ID document in accordance with an illustrative embodiment. Again, in general, the certificate authority chooses pixels in a JPG image of the user using a custom random number generator so as to index pixels in the image. The certificate authority then modifies the chrominance of these chosen pixels so as to hide binary information associated with the user. The steganography reader in the challenge terminal uses the same custom random number generator to find the pixels that have been modified and read the hidden information. In detail, as the operation begins, a certificate authority identifies the image portion of the electronic ID document (step 1002). The certificate authority also identifies information associated with the user to be hidden within the image portion of the electronic ID document (step 1004). The certificate authority transforms the color coefficients for each pixel of the image into one or more chromatic coefficient values (step 1006). The certificate authority then averages adjacent chromatic coefficient values into single chromatic coefficient values, thereby removing approximately half of the original image information and resulting in a subsampled chromatic coefficient (step 1008).

The certificate authority then transforms the subsampled chromatic coefficient values, 8×8 blocks at a time, in order to hide the user information associated with the user utilizing a forward Discrete Cosine Transform (DCT) into a set of frequencies (step 1010). The certificate authority then quantizes the remaining frequency coefficient values by dividing each frequency coefficient value by an associated quantization value (step 1012). The certificate authority eliminates the high frequency coefficients (step 1014). The certificate authority re-orders all the quantized frequency coefficient values into a "zig-zag" order, which places a maximum of zeroes close to each other for better compression (step 1016). The certificate authority executes a simple Run-Length Encoding (RLE) to compress the high frequency coefficient values (step 1018). The certificate authority also executes a Differential Pulse Code Modulation (DPCM) to compress the first low frequency coefficient value (step 1020). The certificate authority then executes a classic Huffman algorithm to compress all of the quantized frequency coefficient values (step 1022). The certificate authority then stores the Huffman tree information in the header of the image (step 1024), with the operation ending thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for embedding binary information through the use of steganography into electronic image identification documents which are provided to the user by an issuing party. Steganography is used to randomly embed binary information into one or parts of an electronic image identification document using a forward Discrete Cosine Transform, which transforms values into frequencies. When the user provides the electronic image identification document to a third party, the third party utilizes a steganography reader to read the embedded binary information as another layer of identity verification.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for validating an identity of a user, the method comprising:
   receiving a signed electronic identification document from the user;
   comparing a signature of the signed electronic identification document utilizing a public key obtained from a certificate authority forming first information associated with the user and a first image of the user, wherein the certificate authority originally issued the signed electronic identification document to the user;
   presenting the first information associated with the user and the first image of the user via a user interface associated with a challenge terminal;
   responsive to a positive indication that the first information associated with the user and the first image of the user are associated with the user and responsive to a request to perform additional validation of the user, attempting a read of steganographic information embedded in the first image of the user, wherein the steganographic information is embedded in the first image of the user in the signed electronic document by modifying chrominance of pixel data in the first image of the user in the signed electronic identification document to store binary information by:
   identifying the first image of the user to be included in the signed electronic identification document;
   identifying one or more pieces of information associated with the user to be hidden within the first image of the user;
   transforming color coefficients for each pixel of the first image of the user into one or more chromatic coefficient values;
   averaging adjacent chromatic coefficient values of the color coefficients into single chromatic coefficient values resulting in a subsampled chromatic coefficient values;
   transforming the subsampled chromatic coefficient values utilizing a forward Discrete Cosine Transform (DCT) into a set of frequencies thereby hiding the one or more pieces of information associated with the user;
   quantizing remaining frequency coefficient values by dividing each frequency coefficient value by an associated quantization value;
   eliminating high frequency coefficients;
   re-ordering all the quantized frequency coefficient values into a "zig-zag" order;
   executing a simple Run-Length Encoding (RLE) to compress the high frequency coefficient values;
   executing a Differential Pulse Code Modulation (DPCM) to compress a first low frequency coefficient value;
   executing a Huffman algorithm to compress all of the quantized frequency coefficient values resulting in Huffman tree information; and
   storing the Huffman tree information in a header of the first image of the user in the signed electronic document; and
   responsive to reading the steganographic information embedded in the first image of the user in the signed electronic document, validating the identity of the user.

2. The method of claim 1, further comprising:
   responsive to an inability to read the steganographic information embedded in the first image of the user in the signed electronic document, invalidating the identity of the user.

3. The method of claim 1, wherein receiving the signed electronic identification document from a user is in response to the user presenting second information and a second image of the user is a user interface of a mobile device prior to sending the signed electronic identification document.

4. The method of claim 1, wherein the certificate authority signs the signed electronic identification document with a private key and wherein the public key is formed from the private key.

5. The method of claim 1, wherein the signed electronic identification document from the user is received in response to a challenge request from an authoritative person associated with the challenge terminal.

6. A non-transitory computer program product comprising a computer readable storage medium having a computer readable program stored therein, wherein the computer readable program, when executed on a computing device, causes the computing device to:
   receive a signed electronic identification document from a user;
   compare a signature of the signed electronic identification document utilizing a public key obtained from a certificate authority forming first information associated with the user and a first image of the user, wherein the certificate authority originally issued the signed electronic identification document to the user;
   present the first information associated with the user and the first image of the user via a user interface associated with a challenge terminal;
   responsive to a positive indication that the first information associated with the user and the first image of the user are associated with the user and responsive to a request to perform additional validation of the user, attempt a read of steganographic information embedded in the first image of the user, wherein the steganographic information is embedded in the first image of the user in the signed electronic document by the computer readable program causing the computing device to modify chrominance of pixel data in the first image of the user in the signed electronic identification document to store binary information by further causing the computing device to:
   identify the first image of the user to be included in the signed electronic identification document;
   identify one or more pieces of information associated with the user to be hidden within the first image oldie user;
   transform color coefficients for each pixel of the first image of the user into one or more chromatic coefficient values;

average adjacent chromatic coefficient values of the color coefficients into single chromatic coefficient values resulting in a subsampled chromatic coefficient values;

transform the subsampled chromatic coefficient values utilizing a forward Discrete Cosine Transform (DCT) into a set of frequencies thereby hiding the one or more pieces of information associated with the user;

quantize remaining frequency coefficient values by dividing each frequency coefficient value by an associated quantization value;

eliminate high frequency coefficients;

re-order all the quantized frequency coefficient values into a "zig-zag" order:

execute a simple Run-Length Encoding (RLE) to compress the high frequency coefficient values;

execute a Differential Pulse Code Modulation (DPCM) to compress a first low frequency coefficient value;

execute a Huffman algorithm to compress all of the quantized frequency coefficient values result in Huffman tree information; and store he Huffman tree information in a header of the first image of the user in the signed electronic document; and responsive to reading the steganographic information embedded in the first image of the user in the signed electronic document, validate an identity of the user.

7. The computer program product of claim 6, wherein the computer readable program further causes the computing device to:
responsive to an inability to read the steganographic information embedded in the first image of the user in the signed electronic document, invalidate the identity of the user.

8. The computer program product of claim 6, wherein receiving the signed electronic identification document from a user is in response to the user presenting second information and a second image of the user via a user interface of a mobile device prior to sending the signed electronic identification document.

9. The computer program product of claim 6, wherein the certificate authority signs the signed electronic identification document with a private key and wherein the public key is formed from the private key.

10. The computer program product of claim 6, wherein the signed electronic identification document from the user is received in response to a challenge request from an authoritative person associated with the challenge terminal.

11. An apparatus comprising:
a processor; and
a memory coupled to the processor, wherein the memory comprises instructions which, when executed by the processor, cause the processor to:
receive a signed electronic identification document from a user;
compare a signature of the signed electronic identification document utilizing a public key obtained from a certificate authority forming first information associated with the user and a first image of the user, wherein the certificate authority originally issued the signed electronic identification document to the user;
present the first information associated with the user and the first image of the user via a user interface associated with a challenge terminal;
responsive to a positive indication that the first information associated with the user and the first image of the user are associated with the user and responsive to a request to perform additional validation of the user, attempt a read of steganographic information embedded in the first image of the user, wherein the steganographic information is embedded in the first image of the user in the signed electronic document by the instructions causing the processor to modify chrominance of pixel data in the first image of the user in the signed electronic identification document to store binary information by further causing the processor to:
identify the first image of the user to be included in the signed electronic identification document;
identify one or more pieces of information associated with the user to be hidden within the first image of the user;
transform color coefficients for each pixel of the first image of the user into one or more chromatic coefficient values;
average adjacent chromatic coefficient values of the color coefficients into single chromatic coefficient values resulting in a subsampled chromatic coefficient values;
transform the subsampled chromatic coeffcient values utilizing a forward Discrete Cosine Transform(DCT) into a set of frequencies thereby hiding the one or more pieces of information associated with the user;
quantize remaining frequency coefficient values by dividing each frequency coefficient value by an associated quantization value;
eliminate high frequency coefficients;
re-order all the quantized frequency coefficient values into a "zig-zag" order;
execute a simple Run-Length Encoding (RLE) to compress the high frequency coefficient values;
execute a Differential Pulse Code Modulation (DPCM) to compress a first low frequency coefficient value;
execute a Huffman algorithm to compress all of the quantized frequency coefficient values resulting in Huffman tree information; and
store the Huffman tree information in a header of the first image of the user in the signed electronic document; and
responsive to reading the steganographic information embedded in the first image of the user in the signed electronic document, validate an identity of the user.

12. The apparatus of claim 11, wherein the instructions farther cause the processor to:
responsive to an inability to read the steganographic information embedded in the first image of the user in the signed electronic document, invalidate the identity of the user.

13. The apparatus of claim 11, wherein the certificate authority signs the signed electronic identification document with a private key and wherein the public key is formed from the private key.

14. The apparatus of claim 11, wherein receiving the signed electronic identification document from a user is in response to the user presenting second information and a second image of the user via a user interface of a mobile device prior to sending the signed electronic identification document.

15. The apparatus of claim 11, wherein the signed electronic identification document from the user is received in response to a challenge request from an authoritative person associated with the challenge terminal.

* * * * *